United States Patent
Matsunaga et al.

(10) Patent No.: US 11,091,174 B2
(45) Date of Patent: Aug. 17, 2021

(54) VEHICLE CONTROL DEVICE

(71) Applicant: HONDA MOTOR CO., LTD., Tokyo (JP)

(72) Inventors: Hideki Matsunaga, Wako (JP); Masaaki Nagashima, Wako (JP); Takeru Goto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 13 days.

(21) Appl. No.: 16/755,938

(22) PCT Filed: Oct. 17, 2017

(86) PCT No.: PCT/JP2017/037447
§ 371 (c)(1),
(2) Date: Apr. 14, 2020

(87) PCT Pub. No.: WO2019/077669
PCT Pub. Date: Apr. 25, 2019

(65) Prior Publication Data
US 2020/0255029 A1  Aug. 13, 2020

(51) Int. Cl.
*B60W 60/00* (2020.01)
*B60W 30/09* (2012.01)
(Continued)

(52) U.S. Cl.
CPC ........ *B60W 60/0016* (2020.02); *B60W 30/09* (2013.01); *G01C 21/3691* (2013.01);
(Continued)

(58) Field of Classification Search
CPC .............. B60W 60/0016; B60W 30/09; G01C 21/3691; G05D 1/0212; G05D 1/0231;
(Continued)

(56) References Cited

U.S. PATENT DOCUMENTS 9,688,273 B2*  6/2017  Mudalige ............. B60W 30/08
2013/0194127 A1*  8/2013  Ishihara ............... H01Q 1/3283
342/70
(Continued)

FOREIGN PATENT DOCUMENTS

JP  2010-079565 A  4/2010
JP  2012-226618 A  11/2012

OTHER PUBLICATIONS

Office Action dated Jan. 26, 2021 issued over the corresponding Japanese Patent Application No. 2019-548808 with the English translation thereof.
(Continued)

*Primary Examiner* — Jason Holloway
(74) *Attorney, Agent, or Firm* — Carrier Blackman & Associates, P.C.; Joseph P. Carrier; William D. Blackman (57) ABSTRACT

A vehicle control device is provided with: a surroundings recognition unit which recognizes external conditions around a host vehicle; a behavior determination unit which, if it is recognized that another vehicle is present along a travel path along which the host vehicle is traveling, determines behavior of the other vehicle; a space setting unit which, if the behavior deter urination unit determines that the other vehicle will cross the travel path, sets a space ahead of the other vehicle in accordance with the behavior of the other vehicle so that the other vehicle can secure fields of vision; and a vehicle control unit which performs control to form the space ahead of the other vehicle.

4 Claims, 9 Drawing Sheets

(51) Int. Cl.
  G01C 21/36 (2006.01)
  G05D 1/02 (2020.01)
  G08G 1/00 (2006.01)
  *G08G 1/0967* (2006.01)
  *G08G 1/16* (2006.01)

(52) U.S. Cl.
  CPC ......... G05D 1/0212 (2013.01); G05D 1/0231 (2013.01); G08G 1/20 (2013.01); *G08G 1/096725* (2013.01); *G08G 1/096791* (2013.01); *G08G 1/161* (2013.01); *G08G 1/166* (2013.01)

(58) Field of Classification Search
  CPC ............... G08G 1/20; G08G 1/096725; G08G 1/096791; G08G 1/161; G08G 1/166
  See application file for complete search history.

(56) References Cited

U.S. PATENT DOCUMENTS

2015/0344030 A1* 12/2015 Damerow ......... B60W 30/0956
  701/1
2017/0032402 A1* 2/2017 Patsiokas ........... G06Q 30/0261
2017/0113665 A1* 4/2017 Mudalige ............... G08G 1/166

OTHER PUBLICATIONS

PCT/ISA/210 from International Application PCT/JP2017/037447 with the English translation thereof.

* cited by examiner

VEHICLE CONTROL DEVICE

TECHNICAL FIELD

The present invention relates to a vehicle control device configured to grant an opportunity of passage to a crossing vehicle that will cross in front of a host vehicle.

BACKGROUND ART

In Japanese Laid-Open Patent Publication No. 2012-226618, a driving assist device is disclosed in which, in the case of recognizing an entering vehicle that intends to enter into a travel path of a host vehicle (driver's own vehicle) just beyond a railroad crossing, the existence of the entering vehicle is notified in advance to the occupant of the host vehicle. In accordance with the driving assist device, the occurrence of a situation is prevented in which, while the host vehicle is traveling through the railroad crossing, the entering vehicle enters into the travel path just beyond the railroad crossing, and the host vehicle cannot depart from the railroad crossing.

SUMMARY OF INVENTION

The flow of traffic becomes smooth by each of respective vehicles granting opportunities of passage (giving way) as appropriate. In accordance with the driving assist device disclosed in Japanese Laid-Open Patent Publication No. 2012-226618, there is a case in which, by being notified, the host vehicle stops before the railroad crossing, and as a result, the host vehicle grants an opportunity of passage with respect to the entering vehicle. However, that which is performed by the driving assist device of Japanese Laid-Open Patent Publication No. 2012-226618 is a control for preventing the host vehicle from stopping inside of a railroad crossing, and it is not a control by which the host vehicle positively grants an opportunity of passage with respect to an entering vehicle.

From the standpoint of enabling a smooth flow of traffic, it is preferable to grant an appropriate opportunity of passage not only to an entering vehicle that enters in front of the host vehicle, but also a crossing vehicle that travels straight forward in front of the host vehicle or travels in an oncoming direction toward the host vehicle. When the crossing vehicle is crossing over the travel path, it is necessary to recognize the presence or absence and the position of an oncoming vehicle that is traveling in an oncoming path whose direction of travel is opposite to that of the travel path. In order to assure that such a crossing vehicle travels smoothly, it is preferable to secure a field of vision for the crossing vehicle.

The present invention has been devised taking into consideration the aforementioned problems, and has the object of providing a vehicle control device, in which it is made easier for a crossing vehicle that crosses over a travel path to recognize the surrounding vicinity of the travel path, and to enable a smooth flow of traffic.

A vehicle control device according to the present invention is characterized in that it includes:

an external environment recognition unit configured to recognize an external environmental state around a periphery of a host vehicle;

a behavior determination unit which, in a case that another vehicle is recognized along a travel path in which the host vehicle is traveling, is configured to determine a behavior of the other vehicle;

a space setting unit which, in a case it is determined by the behavior determination unit that the other vehicle will cross over the travel path, is configured to set a space in front of the other vehicle in accordance with the behavior of the other vehicle so that the other vehicle secures a field of vision; and a vehicle control unit configured to perform a control in order to form the space in front of the other vehicle.

In accordance with the above-described configuration, since the space is formed in front of the other vehicle and enables the other vehicle to secure a field of vision, it becomes possible for the other vehicle to easily recognize the surrounding vicinity when crossing over the travel path. As a result, contact between the other vehicle and an oncoming vehicle is less likely to occur. Further, since the other vehicle can easily cross over the travel path, the time required for the other vehicle to wait for a crossing opportunity can be shortened, and traffic congestion in the intersecting path on the side of the other vehicle can be reduced.

In the vehicle control device according to the present invention, in a case it is determined by the behavior determination unit that the other vehicle will cross in front of the host vehicle and travel straight forward, the space setting unit may set the space between a preceding vehicle traveling in front of the host vehicle and a crossing position where the other vehicle will cross over the travel path.

In accordance with the above-described configuration, since the space is formed between the preceding vehicle and the crossing position of the other vehicle, it becomes easier for the other vehicle to recognize the oncoming vehicle when traveling straight forward. As a result, contact between the other vehicle and an oncoming vehicle is less likely to occur. Further, since the other vehicle can easily cross over the travel path, the time required for the other vehicle to wait for a crossing opportunity can be shortened, and traffic congestion in the intersecting path on the side of the other vehicle can be reduced.

In the vehicle control device according to the present invention:

in a case it is determined by the behavior determination unit that the other vehicle will cross in front of the travel path and travel in a direction opposite to a traveling direction of the host vehicle, the space setting unit may set a first space between a preceding vehicle traveling in front of the host vehicle and a crossing position where the other vehicle will cross over the travel path, and may set a second space between the crossing position and the host vehicle; and the vehicle control unit may perform a control to form the first space and the second space.

In accordance with the above-described configuration, the first space is formed between the preceding vehicle and the crossing position of the other vehicle, and furthermore, the second space is formed between the host vehicle and the crossing position of the other vehicle. Therefore, it is made easier for the other vehicle to recognize an oncoming vehicle when traveling in the oncoming path. As a result, contact between the other vehicle and an oncoming vehicle is less likely to occur. Further, since the other vehicle can easily cross over the travel path, the time required for the other vehicle to wait for a crossing opportunity can be shortened, and traffic congestion in the intersecting path on the side of the other vehicle can be reduced.

In the vehicle control device according to the present invention, the space setting unit may make the second space larger as the first space becomes smaller.

In accordance with the above-described configuration, even if the first space is small, since the second space can be made larger, the other vehicle is capable of entering on the side of the second space while recognizing an oncoming vehicle.

According to the present invention, it is made easier for the other vehicle to recognize the surrounding vicinity, and a smooth flow of traffic is enabled.

DESCRIPTION OF EMBODIMENTS

A preferred embodiment of a vehicle control device according to the present invention will be presented and described in detail below with reference to the accompanying drawings. In the following description, a vehicle (driver's own vehicle) which is the subject of the description will be referred to as a host vehicle, whereas vehicles other than the host vehicle will be referred to as other vehicles. Another vehicle that is traveling in front of the host vehicle is referred to as a preceding vehicle. Unless otherwise specified, another vehicle that is one vehicle in front of the host vehicle will be referred to as a preceding vehicle. Further, another vehicle that will cross in front of the host vehicle and travel in a direction other than the direction of progress of the host vehicle is referred to as a crossing vehicle. Further, another vehicle traveling on the side of the opposite lane (oncoming lane) is referred to as an oncoming vehicle. Further, a road that includes a lane in which the host vehicle is traveling is referred to as a travel path, and a road that includes the oncoming lane is referred to as an oncoming path. Further, a road that crosses over the travel path will be referred to as an intersecting path. Although in the embodiment described below, the description is premised on a left-hand traffic situation, the present invention is also capable of being implemented in a right-hand traffic situation.

[1. Configuration of Host Vehicle 10]

Figure 1:
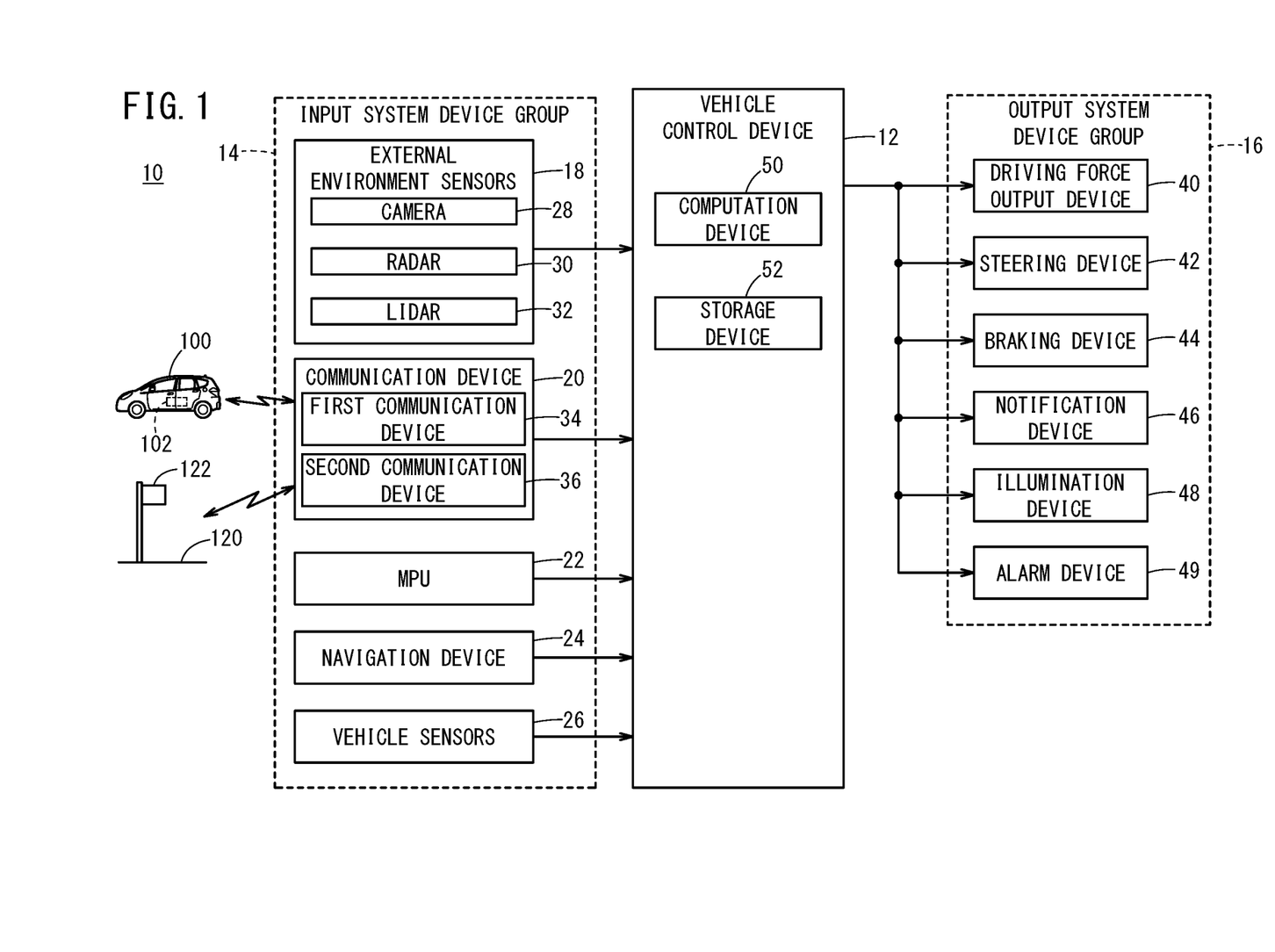
FIG. 1 is a block diagram of a host vehicle equipped with a vehicle control device according to a present embodiment.

As shown in FIG. 1, a host vehicle 10 includes a vehicle control device 12, an input system device group 14 which acquires or stores various information input by the vehicle control device 12, and an output system device group 16 which is operated in response to various instructions output by the vehicle control device 12. The host vehicle 10 is an automated driving vehicle (including a fully automated driving vehicle) in which driving operations are performed by the vehicle control device 12, or a driving assisted vehicle in which portions of the driving operations are assisted.

[1.1. Input System Device Group 14]

In the input system device group 14, there are included external environment sensors 18 that detect a state of the surrounding vicinity (external environment) around the host vehicle 10, a communication device 20 which carries out transmission and reception of information to and from various communication devices located externally of the host vehicle 10, an MPU (high precision map) 22 the positional precision of which is less than or equal to centimeter units, a navigation device 24 that generates a travel route to a destination together with measuring the position of the host vehicle 10, and vehicle sensors 26 that detect the traveling state of the host vehicle 10.

Among the external environment sensors 18, there are included one or more cameras 28 that capture images of the external environment, and one or more radar devices 30 and one or more LIDAR devices 32 that detect the distance between the host vehicle 10 and other surrounding objects, as well as the relative speed between the host vehicle 10 and the surrounding objects. In the communication device 20, there are included a first communication device 34 that performs inter-vehicle communications with communication devices 102 disposed in other vehicles 100, and a second communication device 36 that performs road-to-vehicle communications with communication devices 122 provided in infrastructure such as a travel path 120 and the like. The first communication device 34 acquires other vehicle information, and the second communication device 36 acquires road information. The navigation device 24 includes a satellite navigation system and a self-contained navigation system. The vehicle sensors 26 include a vehicle speed sensor, an acceleration sensor, a yaw rate sensor, an inclination sensor, and the like, none of which are shown.

[1.2. Output System Device Group 16]

The output system device group 16 includes a driving force output device 40, a steering device 42, a braking device 44, a notification device 46, an illumination device 48, and an alarm device 49. The driving force output device 40 includes a driving force output ECU and a drive source such as an engine or a traction motor. The driving force output device 40 generates a driving force in accordance with an operation of an accelerator pedal performed by the vehicle occupant, or a driving control instruction output from the vehicle control device 12. The steering device 42 includes an electric power steering system (EPS) ECU and an EPS actuator. The steering device 42 generates a steering force in accordance with an operation of the steering wheel performed by the vehicle occupant, or a steering control instruction output from the vehicle control device 12. The braking device 44 includes a brake ECU and a brake actuator. The braking device 44 generates a braking force in accordance with an operation of the brake pedal performed by the vehicle occupant, or a braking control instruction output from the vehicle control device 12. The notification device 46 includes a notification ECU, and an information transmission device (a display device, an audio device, a haptic device, etc.). The notification device 46 issues a notification to the vehicle occupant in accordance with a notification instruction output from the vehicle control device 12 or another ECU. The illumination device 48 includes headlights, and the alarm device 49 includes a horn.

[1.3. Vehicle Control Device 12]

Figure 2:
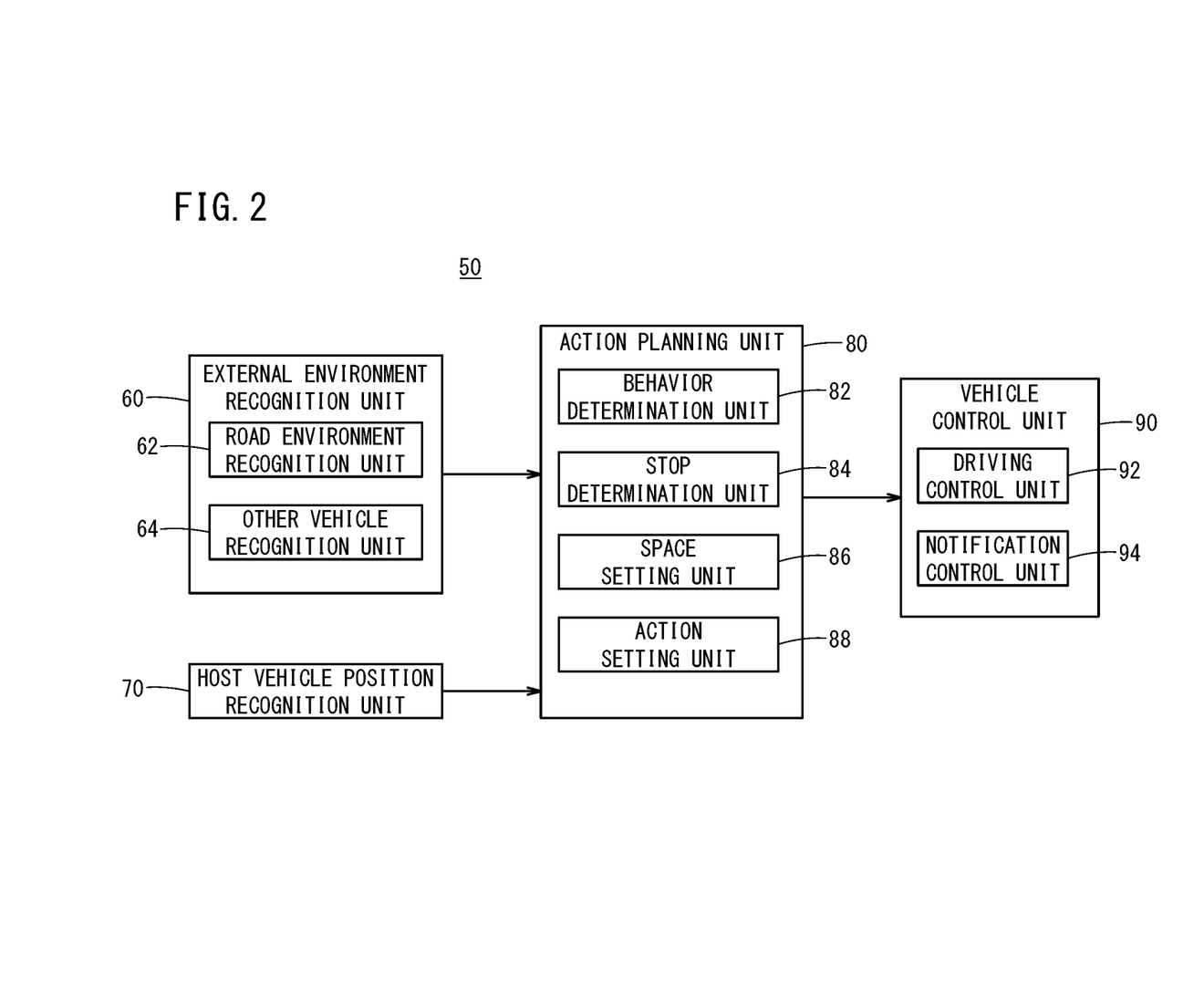
FIG. 2 is a functional block diagram of a computation device provided in the vehicle control device.

The vehicle control device 12 is configured by an ECU, and includes a computation device 50 such as a processor, and a storage device 52 such as a ROM and a RAM. The vehicle control device 12 realizes various functions by the computation device 50 executing programs stored in the storage device 52. As shown in FIG. 2, the computation device 50 functions as an external environment recognition unit 60, a host vehicle position recognition unit 70, an action planning unit 80, and a vehicle control unit 90.

On the basis of information output from the external environment sensors 18, the communication device 20, and the MPU 22, the external environment recognition unit 60 recognizes the circumstances and objects in the vicinity around the host vehicle 10. The external environment recognition unit 60 includes a road environment recognition unit 62 and an other vehicle recognition unit 64. On the basis of image information from the cameras 28, map information from the MPU 22, and road information acquired by the second communication device 36, the road environment recognition unit 62 recognizes the road environment in general, for example, the road shape, the road width, the positions of lane markings, the number of lanes, the lane width, and the like. Based on the image information from the cameras 28 and/or the detection information from the radar devices 30 and the LIDAR devices 32, the other vehicle recognition unit 64 recognizes the existence, the position, the size, the type, and the traveling direction of other vehicles 100 which are traveling or stopped in the vicinity of the host vehicle 10, together with recognizing the distance and the relative speed between the host vehicle 10 and the other vehicles 100.

Based on information output from the MPU 22 and the navigation device 24, the host vehicle position recognition unit 70 recognizes the position of the host vehicle 10 and the map information around the position thereof.

The action planning unit 80 determines the traveling situation of the host vehicle 10, and formulates behaviors of the host vehicle 10, on the basis of the recognition results of the external environment recognition unit 60 and the host vehicle position recognition unit 70, and the detection results of the vehicle sensors 26. In the action planning unit 80, there are included a behavior determination unit 82, a stop determination unit 84, a space setting unit 86, and an action setting unit 88. The behavior determination unit 82 determines the behavior of other vehicles 100, in the case it is recognized by the other vehicle recognition unit 64 that other vehicles 100 are traveling along the travel path 120 in which the host vehicle 10 is traveling. In this instance, a determination is made as to whether or not the other vehicle 100 is a crossing vehicle 100c, and in the case of being a crossing vehicle 100c, the traveling direction thereof is determined. On the basis of the recognition result of the other vehicle recognition unit 64, the stop determination unit 84 determines the presence or absence of a preceding vehicle 100f, determines whether or not the preceding vehicle 100f is a stopped vehicle or is traveling at a low speed that can be regarded as being a stopped vehicle, and determines whether or not stopping of the host vehicle 10 is necessary. In the case it is determined by the behavior determination unit 82 that the crossing vehicle 100c will cross over the travel path 120 and proceed in a direction that differs from a traveling direction 106 of the host vehicle 10 (see FIG. 4, etc.), the space setting unit 86 sets spaces 128 (refer to FIG. 4, etc.) in front of the crossing vehicle 100c in accordance with the behavior of the crossing vehicle 100c so that the crossing vehicle 100c can secure a field of vision. Further, the space setting unit 86 sets stop positions 170a and 170b (see FIG. 4) corresponding to the spaces 128. The action setting unit 88 sets actions to be taken by the host vehicle 10, on the basis of the recognition results of the external environment recognition unit 60 and the host vehicle position recognition unit 70, and the setting result of the space setting unit 86. In the case that the host vehicle 10 is made to travel, a travel trajectory (target travel trajectory) and a vehicle speed (target vehicle speed) targeted by the host vehicle 10 are set.

Based on the determination result of the action planning unit 80, the vehicle control unit 90 calculates control command values with respect to the output device group. The vehicle control unit 90 includes a driving control unit 92 that carries out the travel control, and a notification control unit 94 that performs the notification control. The driving control unit 92 generates control instructions in accordance with the target travel trajectory and the target vehicle speed set by the action planning unit 80, and outputs the control instructions to the driving force output device 40, the steering device 42, and the braking device 44. Further, the driving control unit 92 outputs operation instructions to the illumination device 48 and the alarm device 49. The notification control unit 94 generates notification instructions to the vehicle occupant, and outputs the notification instructions to the notification device 46.

Returning to FIG. 1, the description of the vehicle control device 12 will be continued. Apart from the various programs executed by the computation device 50, the storage device 52 stores numerical values used for comparisons and determinations made in the respective processes.

[2. Concept of Spaces 128]

Figure 3:
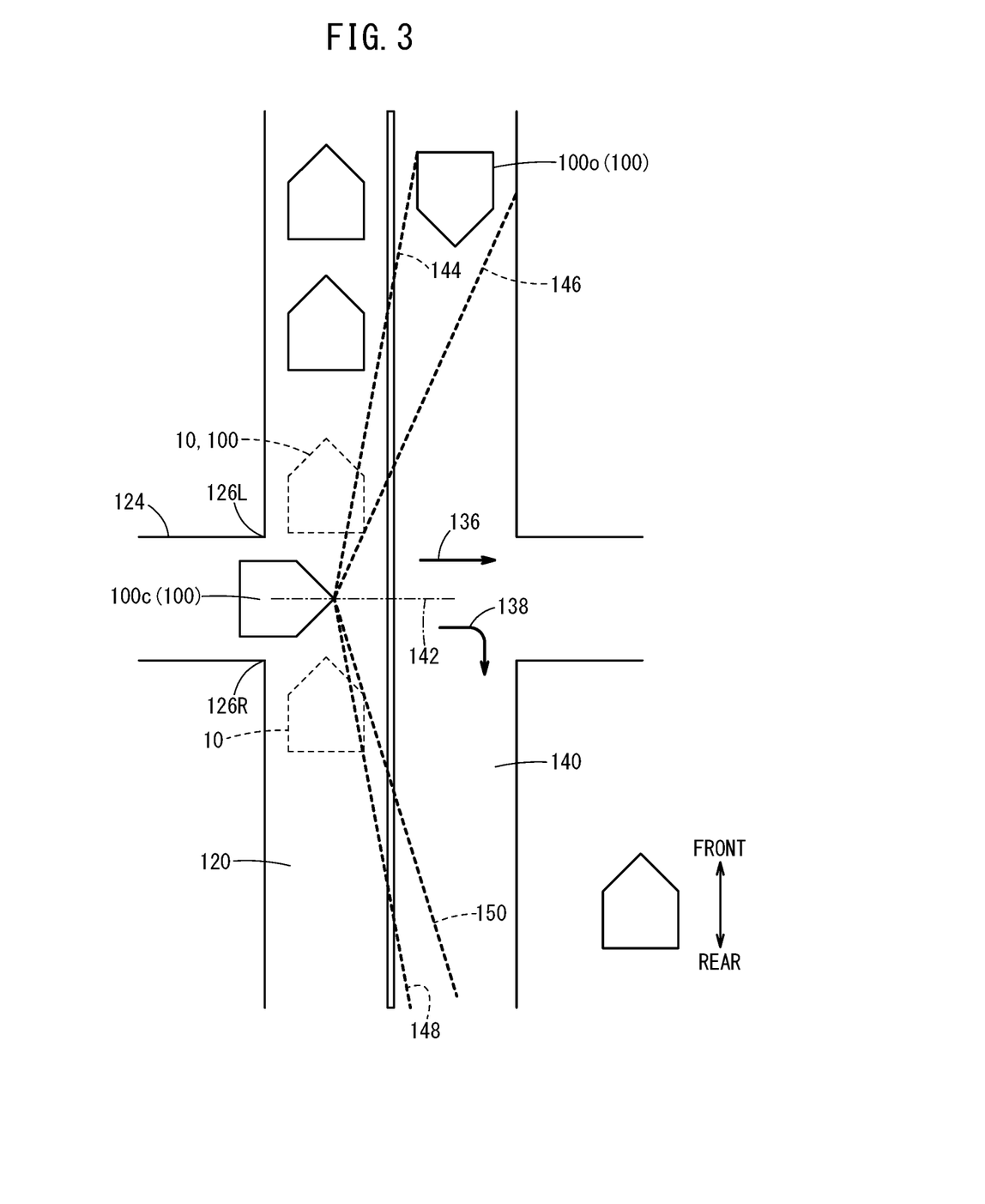
FIG. 3 is an explanatory diagram for describing fields of vision of a crossing vehicle.

The spaces 128 that are set by the vehicle control device 12 will be described with reference to FIGS. 3 and 4. In the following description, a left-hand traffic region is assumed. In the case of a right-hand traffic region, the features shown on the left and right are reversed.

When crossing over the travel path 120 (when traveling straight forward in the direction of an arrow 136 or turning to the right in the direction of an arrow 138), the crossing vehicle 100c recognizes a side in a more forward direction of the traveling direction 106 than a crossing position 142, and more specifically, recognizes an oncoming path 140 more on the left side than the crossing position 142, and confirms the presence or absence of an oncoming vehicle 100o therein. At this time, in the case that a vehicle (the other vehicle 100 or the host vehicle 10 or the like) is not stopped in proximity to the left side of the crossing position 142, since a field of vision 144 of the crossing vehicle 100c is sufficiently assured, the oncoming vehicle 100o can easily be confirmed from the crossing vehicle 100c. In contrast thereto, in the case that a vehicle is stopped in proximity to the left side of the crossing position 142, a field of vision 146 of the crossing vehicle 100c is not sufficiently assured, and therefore, it is difficult to confirm the oncoming vehicle 100o from the crossing vehicle 100c.

Further, when crossing over the travel path 120 and entering into the oncoming path 140 (when turning to the right in the direction of the arrow 138), the crossing vehicle 100c recognizes the oncoming path 140 more on the left side than the crossing position 142, and together therewith, recognizes a side more in an opposite direction to the traveling direction 106 than the crossing position 142, and more specifically, recognizes the travel path 120 more on the right side than the crossing position 142, and confirms the presence or absence of a motorcycle (two-wheeled vehicle) or the like therein. At this time, in the case that a vehicle (the host vehicle 10) is not stopped in proximity to the right side of the crossing position 142, a field of vision 148 of the crossing vehicle 100c is sufficiently assured, and therefore, the motorcycle can easily be confirmed from the crossing vehicle 100c. Further, since sufficient space is secured in proximity to the right side of the crossing position 142, the crossing vehicle 100c easily turns to the right. In contrast thereto, in the case that a vehicle is stopped in proximity to the right side of the crossing position 142, a field of vision 150 of the crossing vehicle 100*c* is not sufficiently assured, and therefore, it is difficult to confirm the motorcycle from the crossing vehicle 100*c*. Further, since sufficient space is not secured in proximity to the right side of the crossing position 142, it is difficult for the crossing vehicle 100*c* to make a right turn.

Figure 4:
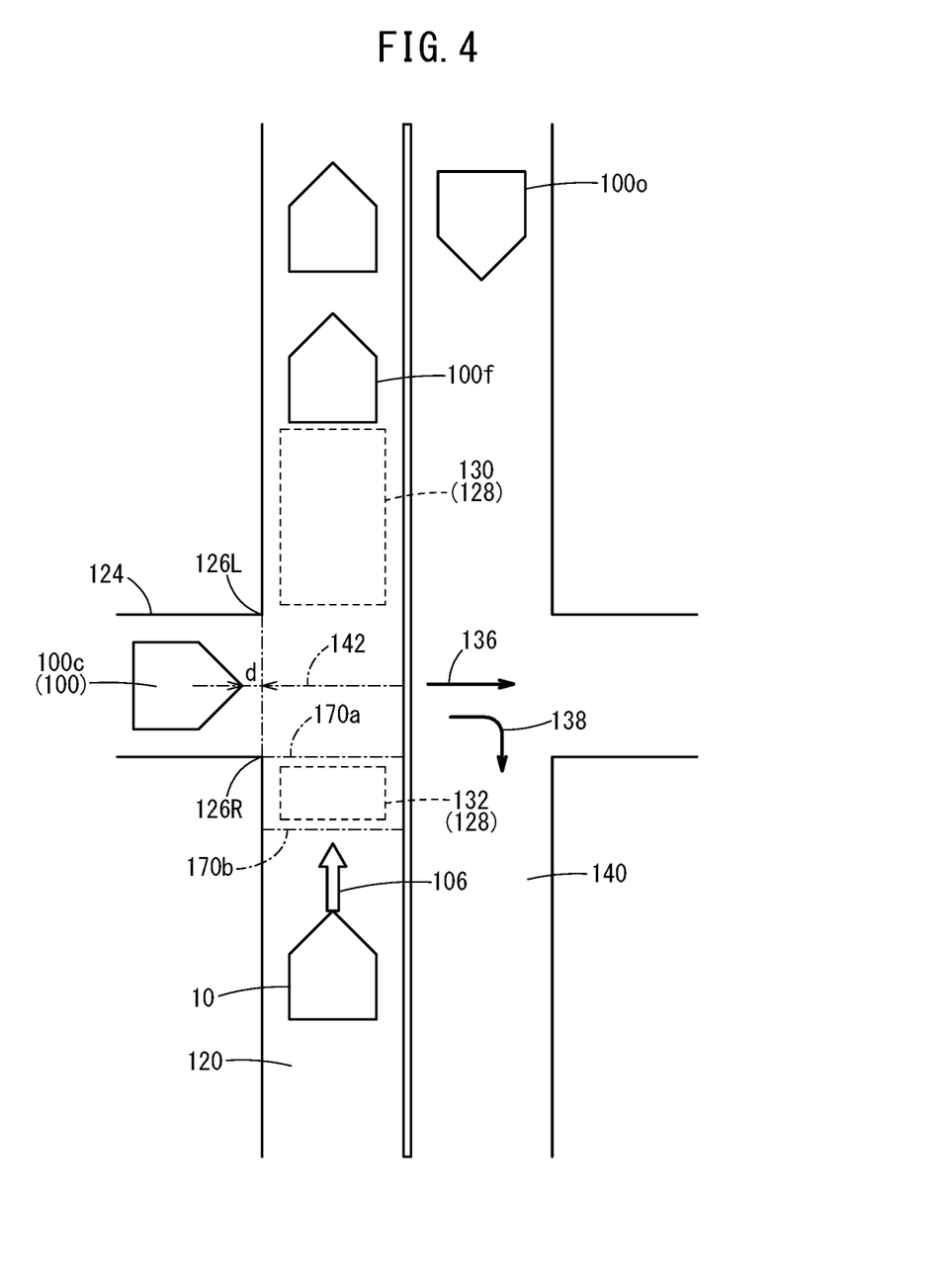
FIG. 4 is an explanatory diagram for describing a space.

In consideration of the above circumstances, the vehicle control device 12 sets the spaces 128 as shown in FIG. 4. The spaces 128 include a first space 130 and a second space 132. The first space 130 is set within the travel path 120 on a side in the forward direction of the traveling direction 106, with the crossing position 142 or an intersection position 126L on the left side of an intersecting path 124 in which the crossing vehicle 100*c* is traveling serving as a reference point. The second space 132 is set within the travel path 120 on a side in the opposite direction of the traveling direction 106, with the crossing position 142 or an intersection position 126R on the right side of the intersecting path 124 serving as a reference point.

The sizes of the first space 130 and the second space 132 can be set arbitrarily. Specific sizes may be set, or the sizes may be set appropriately according to the situation at that time. For example, a vehicle length of one vehicle is set as an initial value for the first space 130. Further, a vehicle length of a 0.5 portion of a vehicle is set as an initial value for the second space 132. The sizes of the first space 130 and the second space 132 are stored in the storage device 52 in advance.

By formation of the first space 130, the field of vision 144 when the crossing vehicle 100*c* crosses over the crossing position 142 and travels straight forward or turns to the right is assured. By formation of the second space 132, the field of vision 148 when the crossing vehicle 100*c* crosses over the crossing position 142 and turns to the right is assured, while in addition, a space that enables entry of the crossing vehicle 100*c* to the right side is assured.

[3. Processes Performed by Vehicle Control Device 12]

Figure 5:
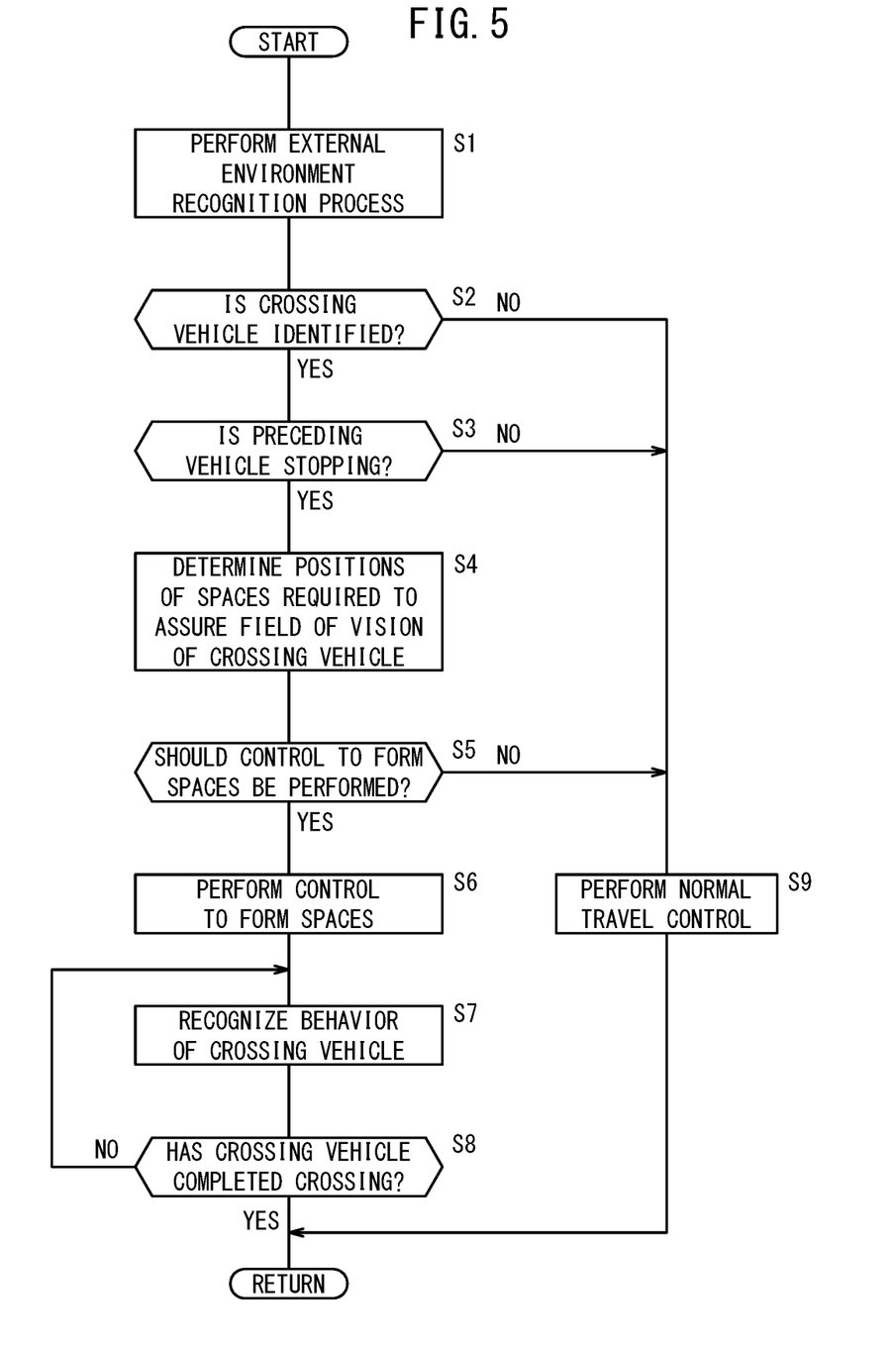
FIG. 5 is a flowchart of a process performed by the vehicle control device.

An example of processes performed by the vehicle control device 12 will now be described with reference to FIGS. 4 and 5. The process steps described below are repeatedly executed while the electric power of the host vehicle 10 is turned on.

In step S1, the external environment recognition unit 60 inputs the most recent information output from the input system device group 14, and recognizes the external environment.

In step S2, the other vehicle recognition unit 64 recognizes other vehicles 100 along the travel path 120 in front of the host vehicle 10. From among the other vehicles 100 that are recognized by the other vehicle recognition unit 64, the behavior determination unit 82 identifies as other vehicles 100 along the travel path 120 other vehicles 100 whose distance d from the travel path 120 is less than or equal to a first predetermined distance dl, and the front portions of which are directed along the travel path 120. For example, the distance d between the travel path 120 and the other vehicle 100 may be specified, for example, as a distance between the other vehicle 100 and a partition line at an end of the travel path 120, or may be specified as a distance between a sidewalk and the other vehicle 100. Further, other vehicles 100 traveling toward the travel path 120 in an area along the travel path 120 may be identified as being other vehicles 100 along the travel path 120.

Further, the behavior determination unit 82 determines whether or not the other vehicle 100 is indicating an intention to proceed in a direction other than the traveling direction 106 of the host vehicle 10 (arrows 136 and 138). For example, based on the recognition result of the other vehicle recognition unit 64, the behavior determination unit 82 determines an operation of the direction indicator (turn signal) of the other vehicle 100. In the case that the direction indicator is indicating a left turn, a determination is made that the other vehicle 100 is intending to merge into the travel path 120. In contrast thereto, in the case that the direction indicator is indicating a right turn, or in the case that the direction indicator is not being operated, a determination is made that the other vehicle 100 is intending to cross over the travel path 120, and the other vehicle 100 is identified as being the crossing vehicle 100*c*. Moreover, whether or not the other vehicle 100 is the crossing vehicle 100*c* can also be identified on the basis of the other vehicle information acquired by the first communication device 34. In the case that the behavior determination unit 82 identifies the crossing vehicle 100*c* (step S2: YES), the process transitions to step S3. On the other hand, in the case that the behavior determination unit 82 does not identify the crossing vehicle 100*c* (step S2: NO), the process transitions to step S9.

Upon transitioning from step S2 to step S3, the other vehicle recognition unit 64 recognizes the presence or absence of the preceding vehicle 100*f*, together with recognizing the speed of the preceding vehicle 100*f*. On the basis of the speed of the preceding vehicle 100*f* recognized by the other vehicle recognition unit 64, the stop determination unit 84 determines whether or not the preceding vehicle 100*f* is a stopped vehicle or is traveling at a low speed that can be regarded as being a stopped vehicle. In the case that the preceding vehicle 100*f* is a stopped vehicle or is traveling at a low speed (step S3: YES), the process transitions to step S4. On the other hand, in the case that the preceding vehicle 100*f* is traveling at a speed that is greater than the low speed or in the case that the preceding vehicle 100*f* does not exist (step S3: NO), the process transitions to step S9.

Upon transitioning from step S3 to step S4, in accordance with the behavior of the crossing vehicle 100*c* (the direction in which the crossing vehicle 100*c* intends to travel), the space setting unit 86 determines the positions of the spaces 128 which are required in order for the crossing vehicle 100*c* to secure a field of vision. In step S2, in the case it was determined by the behavior determination unit 82 that the crossing vehicle 100*c* travels straight forward in the direction of the arrow 136, the space setting unit 86 determines that it is necessary for the first space 130 to be set. In the case it was determined by the behavior determination unit 82 that the crossing vehicle 100*c* turns to the right in the direction of the arrow 138, the space setting unit 86 determines that it is necessary for the first space 130 and the second space 132 to be set.

In step S5, a determination is made as to whether or not a control to form the spaces 128 should be performed. Details of the process performed in this instance will be described in item [4] below. In the case that the control to form the spaces 128 is performed (step S5: YES), the process transitions to step S6. On the other hand, in the case that the control to form the spaces 128 is not performed (step S5: NO), the process transitions to step S9.

Upon transitioning from step S5 to step S6, the vehicle control device 12 performs a control in order to form the spaces 128. The space setting unit 86 sets the first space 130 in the case that the crossing vehicle 100*c* travels straight forward in the direction of the arrow 136, and sets the first space 130 and the second space 132 in the case that the crossing vehicle 100c turns to the right in the direction of the arrow 138. Furthermore, in the case that only the first space 130 is set, the space setting unit 86 sets the stop position 170a more on the side of the host vehicle 10 than the intersection position 126R or the crossing position 142. Further, in the case that the second space 132 is set, the space setting unit 86 sets the stop position 170b more on the side of the host vehicle 10 than the second space 132.

The action setting unit 88 sets the travel trajectory and the vehicle speed in order to cause the host vehicle 10 to stop at the stop positions 170a and 170b. The driving control unit 92 calculates command values for deceleration and a steering amount in order to cause the host vehicle 10 to travel in accordance with the travel trajectory and the vehicle speed, and to stop at the stop position 170a or at the stop position 170b. In addition, the command values are output to the driving force output device 40, the steering device 42, and the braking device 44 to thereby execute the stop control for the host vehicle 10.

At this time, the driving control unit 92 also executes an output control of a signal to prompt the crossing vehicle 100c to cross over the travel path 120. The driving control unit 92 outputs a predetermined operation instruction to the illumination device 48 and/or the alarm device 49 to thereby output the signal.

In step S7, the other vehicle recognition unit 64 recognizes the behavior of the crossing vehicle 100c. In step S8, the behavior determination unit 82 determines whether or not the crossing vehicle 100c has completed crossing over the travel path 120. On the basis of the recognition result of the other vehicle recognition unit 64, the behavior determination unit 82 determines whether or not crossing over has been completed, by determining whether or not a rear portion of the crossing vehicle 100c has moved outside of the travel path 120. In the case that the crossing vehicle 100c has completed crossing over (step S8: YES), the series of process steps is temporarily brought to an end. On the other hand, in the case that the crossing vehicle 100c has not completed crossing over (step S8: NO), the process returns to step S7, and the determination of the behavior of the crossing vehicle 100c is continued.

Upon transitioning from step S2, step S3, or step S5 to step S9, the space setting unit 86 does not set the spaces 128. At this time, the vehicle control device 12 performs a normal travel control.

[4. Determination of Whether to Perform Control to Form the Spaces 128]

A description will be given concerning the determination performed in step S5 of the flowchart shown in FIG. 5. As shown in FIG. 4, in the case that the crossing vehicle 100c travels in a straight forward direction (arrow 136), the space setting unit 86 determines whether or not to perform the control to form the first space 130. In the case that the crossing vehicle 100c travels in a direction to make a right turn (arrow 138), the space setting unit 86 determines whether or not to perform the control to form the first space 130 and the second space 132. Whether or not to perform the control to form the spaces 128 is determined from the standpoint of whether or not such spaces 128 are capable of being formed, or alternatively, whether or not it is necessary for such spaces 128 to be formed.

[4.1. Case in Which Formation of Spaces 128 is Impossible]

Figure 6:
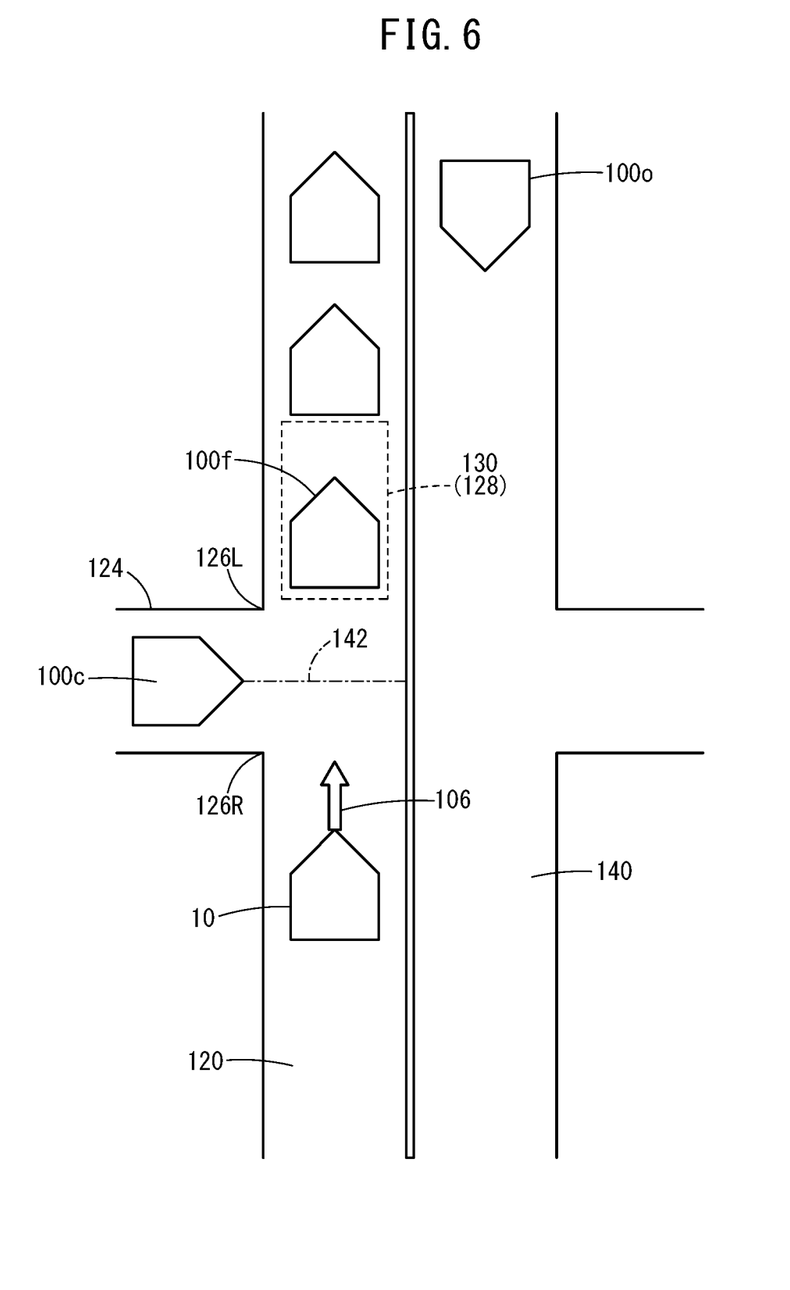
FIG. 6 is a diagram illustrating a situation in which the space is incapable of being set.

As shown in FIG. 6, in the case that a preceding vehicle 100f is on a side in a more forward direction of the traveling direction 106 than the crossing position 142, and is stopping in proximity to the crossing position 142, the first space 130 cannot be formed between the preceding vehicle 100f and the intersection position 126L of the travel path 120 and the intersecting path 124, or between the preceding vehicle 100f and the crossing position 142. In such a case, the space setting unit 86 determines not to perform the control to form the spaces 128 (first space 130).

[4.2. Case in Which Formation of Spaces 128 is Unnecessary]

Figure 7:
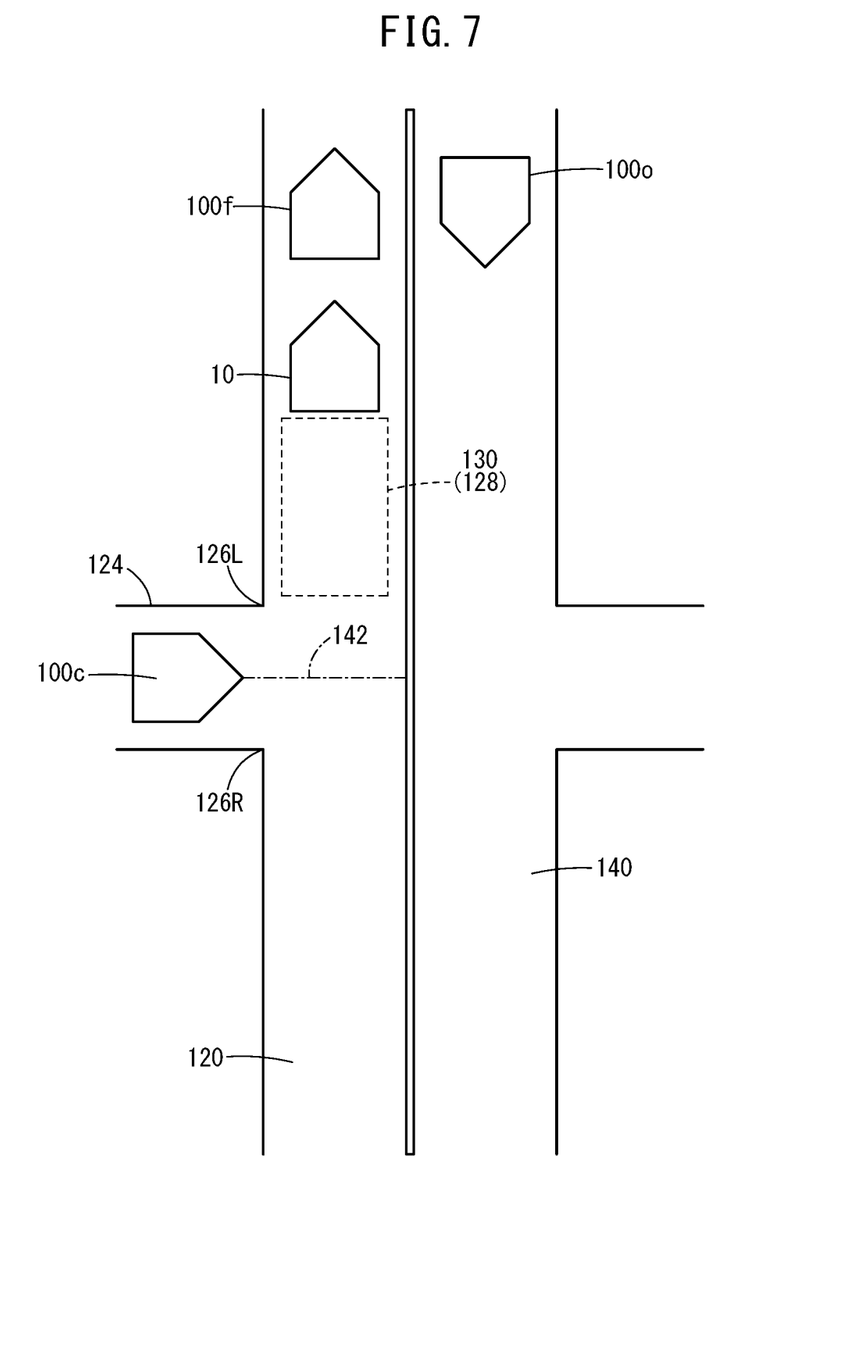
FIG. 7 is a diagram showing a situation in which it is not necessary to set the space.

As shown in FIG. 7, it is assumed that the host vehicle 10 travels normally and comes to a stop behind the preceding vehicle 100f. At this time, it is assumed that the first space 130 would be formed between the host vehicle 10 and the intersection position 126L or the crossing position 142. In the case that such a situation is assumed, the space setting unit 86 does not perform the control to form the spaces 128 (first space 130), and determines to perform normal traveling.

[4.3. Conditions for Performing Control to Form the Spaces 128]

In the case that the following conditions (1) and (2) are satisfied, the space setting unit 86 determines that the control to form the spaces 128 (first space 130) is performed.

(1) The preceding vehicle 100f stops on a side in a more forward direction of the traveling direction 106 than the intersection position 126L.

(2) The distance from a rear end position of the preceding vehicle 100f to the intersection position 126L is longer than the length of the first space 130, and is shorter than a length obtained by adding the length of the host vehicle 10 to the length of the first space 130.

[5. Modifications]

[5.1. Modification 1]

Figure 8:
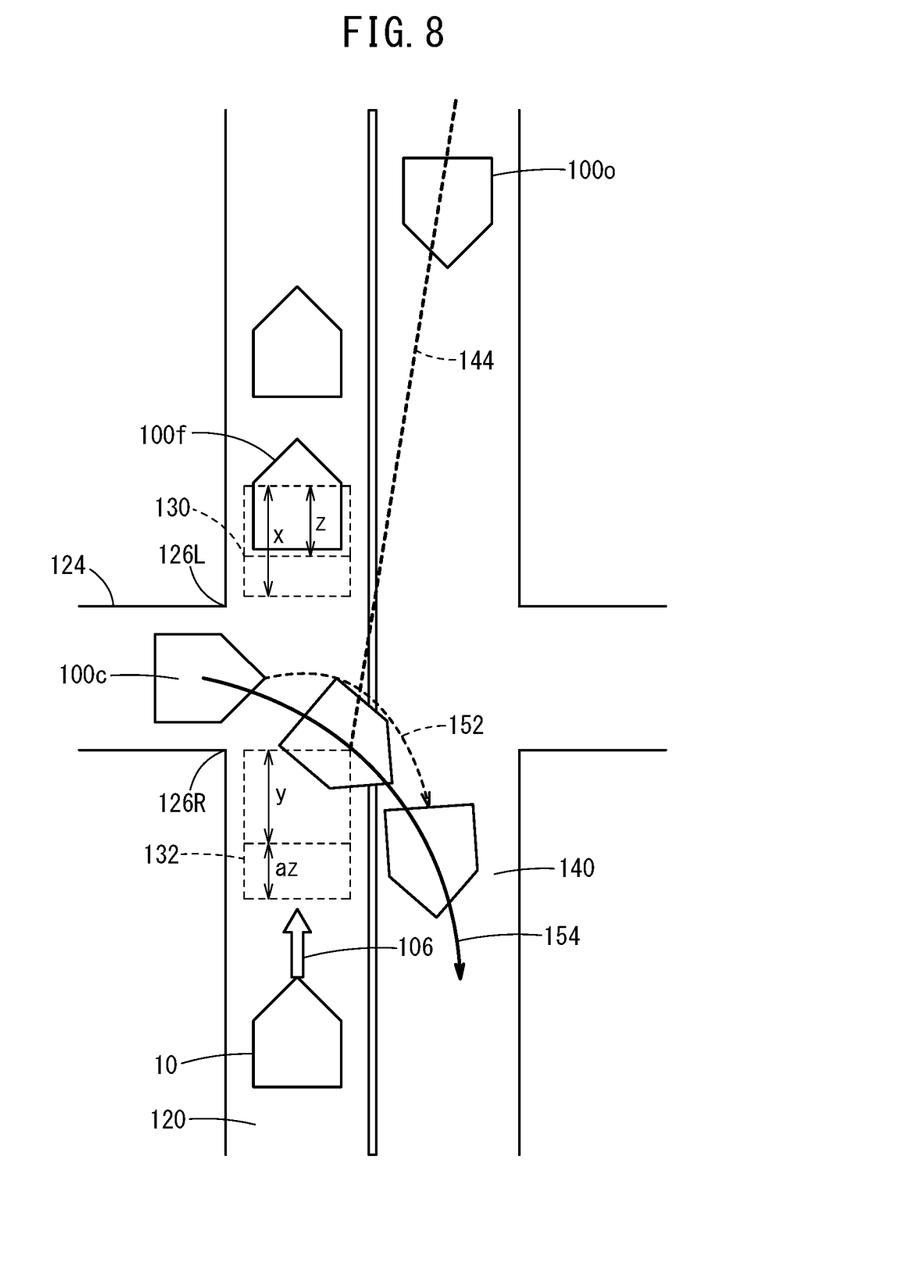
FIG. 8 is an explanatory diagram for describing a first modification.

A modification of the method of setting the spaces 128 in the case that the crossing vehicle 100c makes a right turn will be described with reference to FIG. 8. In the case that the crossing vehicle 100c makes a right turn, it is possible to set the first space 130 to be smaller (shortened along the traveling direction 106), by setting the second space 132 to be larger (lengthened along the traveling direction 106).

In the case that the second space 132 is made larger, the crossing vehicle 100c becomes capable of traveling along a trajectory 154 more on an inner side than a trajectory 152 in which traveling is enabled in the case that the second space 132 were set normally. By traveling along the trajectory 154 on the inner side, the crossing vehicle 100c can secure the field of vision 144 in order to confirm the presence or absence of the oncoming vehicle 100o.

In the case that the distance from the rear end position of the preceding vehicle 100f to the intersection position 126L is shorter than a predetermined length of the first space 130, the space setting unit 86 calculates a length obtained by adding to the second space 132 a length obtained by multiplying such a shortness by a predetermined coefficient, and thereby correcting the second space 132.

For example, let the size of the first space 130 which is set in advance be x, and let the size of the second space 132 be y. In this instance, let the distance from the rear end position of the preceding vehicle 100f to the intersection position 126L be given by x−z. At this time, the size of the second space 132 is set as y+az (where "a" is a coefficient). In this manner, the second space 132 may be made larger as the first space 130 becomes smaller.

[5.2. Modification 2]

Figure 9:
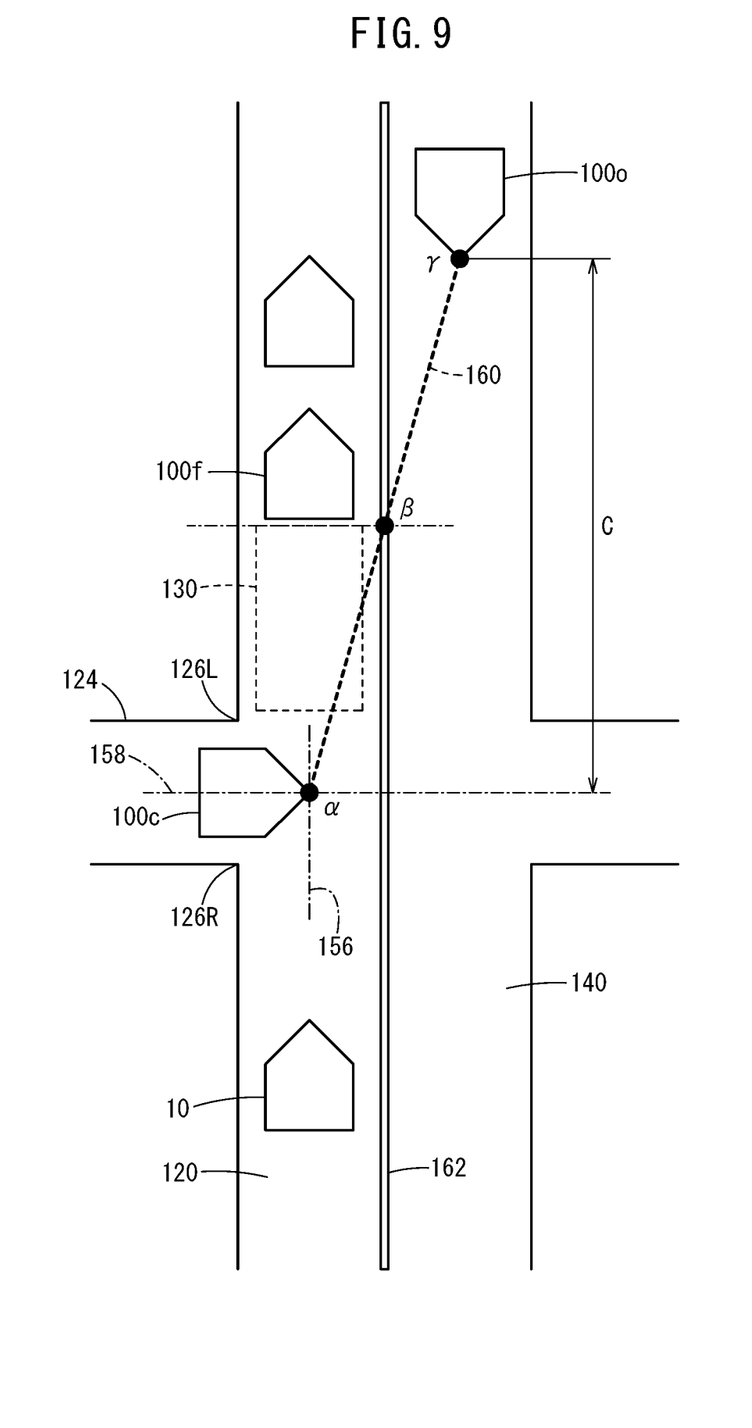
FIG. 9 is an explanatory diagram for describing a second modification.

An example of a method of dynamically setting the first space 130 will be described with reference to FIG. 9. In the second modification, the first space 130 is set from the standpoint of assuring an amount of time that can be spent until the crossing vehicle 100c finishes crossing. In the following process, the first space 130, which is necessary in order for the crossing vehicle 100c to recognize the oncoming vehicle 100o at a first center point α of the travel path 120, is set. The first center point α is defined by an intersection point between a center line 156 of the travel path 120 and a center line 158 of the intersecting path 124. It should be noted that the position of the first center point α can be changed as appropriate.

The time that is spent until the crossing vehicle 100c finishes crossing from the first center point α is indicated by t. Further, the speed of the oncoming vehicle 100o is indicated by v1. In order for the crossing vehicle 100c to complete crossing over, starting from the first center point α without contacting the oncoming vehicle 100o, at the point in time when the crossing vehicle 100c starts to cross over, the oncoming vehicle 100o must be separated to the left (on the side in the forward direction of the traveling direction 106) from the center line 158 by a distance that is greater than or equal to a distance C (=v1×t). Stated otherwise, it is necessary for the crossing vehicle 100c to visually recognize the oncoming vehicle 100o which is separated by the distance that is greater than or equal to the distance C to the left from the first center point α. For this reason, the first space 130 is required so as to enable visual recognition of the oncoming vehicle 100o which is separated by the distance that is greater than or equal to the distance C.

The first space 130 is set in the following manner. A second center point of the oncoming path 140, which is separated by the distance C to the left from the center line 158, is indicated by α. In addition, an intersection point β between a center line 162 and a straight line 160 connecting the first center point α and the second center point γ is defined as an end position of the first space 130. The space setting unit 86 sets one end of the first space 130 to the intersection position 126L, and sets the other end to the position of the intersection point β.

[6. Summary of Present Embodiment]

The vehicle control device 12 includes the external environment recognition unit 60 configured to recognize the external environmental state around the periphery of the host vehicle 10, the behavior determination unit 82 which, in the case that the crossing vehicle 100c (other vehicle 100) is recognized along the travel path 120 in which the host vehicle 10 is traveling, is configured to determine the behavior of the crossing vehicle 100c, the space setting unit 86 which, in the case it is determined by the behavior determination unit 82 that the crossing vehicle 100c will cross over the travel path 120, is configured to set the space 128 in front of the crossing vehicle 100c in accordance with the behavior of the crossing vehicle 100c so that the crossing vehicle 100c secures the field of vision 144 (and 148), and the vehicle control unit 90 configured to perform the control in order to form the space 128 in front of the crossing vehicle 100c.

In accordance with the above-described configuration, since the spaces 128 are formed in front of the crossing vehicle 100c (other vehicle 100) and enable the crossing vehicle 100c to secure the fields of vision 144 and 148, it becomes possible for the crossing vehicle 100c to easily recognize the surrounding vicinity when crossing over the travel path 120. As a result, contact between the crossing vehicle 100c and the oncoming vehicle 100o is less likely to occur. Further, since the crossing vehicle 100c can easily cross over the travel path 120, the time required for the crossing vehicle 100c to wait for a crossing opportunity can be shortened, and traffic congestion in the intersecting path 124 on the side of the crossing vehicle 100c can be reduced.

In the case it is determined by the behavior determination unit 82 that the crossing vehicle 100c will cross in front of the host vehicle 10 and travel straight forward, the space setting unit 86 sets the space 128 between the preceding vehicle 100f traveling in front of the host vehicle 10 and the crossing position 142 where the crossing vehicle 100c will cross over the travel path 120.

In accordance with the above-described configuration, since the space 128 (first space 130) is formed between the preceding vehicle 100f and the crossing position 142 of the crossing vehicle 100c (other vehicle 100), it becomes easier for the crossing vehicle 100c to recognize the oncoming vehicle 100o when traveling straight forward. As a result, contact between the crossing vehicle 100c and the oncoming vehicle 100o is less likely to occur. Further, since the crossing vehicle 100c can easily cross over the travel path 120, the time required for the crossing vehicle 100c to wait for a crossing opportunity can be shortened, and traffic congestion in the intersecting path 124 on the side of the crossing vehicle 100c can be reduced.

In the case it is determined by the behavior determination unit 82 that the crossing vehicle 100c will cross in front of the travel path 120 and travel in a direction opposite to the traveling direction 106 of the host vehicle 10, the space setting unit 86 sets the first space 130 between the preceding vehicle 100f traveling in front of the host vehicle 10 and the crossing position 142 where the crossing vehicle 100c will cross over the travel path 120, and sets the second space 132 between the crossing position 142 and the host vehicle 10, and the vehicle control unit 90 performs the control to form the first space 130 and the second space 132.

In accordance with the above-described configuration, the first space 130 is formed between the preceding vehicle 100f and the crossing position 142 of the crossing vehicle 100c (other vehicle 100), and furthermore, the second space 132 is formed between the host vehicle 10 and the crossing position 142 of the crossing vehicle 100c. Therefore, it is made easier for the crossing vehicle 100c to recognize the oncoming vehicle 100o when traveling in the oncoming path 140. As a result, contact between the crossing vehicle 100c and the oncoming vehicle 100o is less likely to occur. Further, since the crossing vehicle 100c can easily cross over the travel path 120, the time required for the crossing vehicle 100c to wait for a crossing opportunity can be shortened, and traffic congestion in the intersecting path 124 on the side of the crossing vehicle 100c can be reduced.

The space setting unit 86 makes the second space 132 larger as the first space 130 becomes smaller.

In accordance with the above-described configuration, even if the first space 130 is small, since the second space 132 can be made larger, the crossing vehicle 100c (other vehicle 100) is capable of entering on the side of the second space 132 while recognizing the oncoming vehicle 100o.

The invention claimed is:

1. A vehicle control device, comprising:
an external environment recognizer configured to recognize an external environmental state around a periphery of a host vehicle;
a behavior determiner which, in a case that another vehicle is recognized along a travel path in which the host vehicle is traveling, is configured to determine a behavior of the other vehicle;
a space setter which, in a case it is determined by the behavior determiner that the other vehicle will cross over the travel path, is configured to set a space in front of the other vehicle so that the other vehicle secures a field of vision; and a vehicle controller configured to perform a control in order to form the space in front of the other vehicle, wherein:

in a case it is determined by the behavior determiner that the other vehicle will cross in front of the travel path and travel in a direction opposite to a traveling direction of the host vehicle, the space setter sets a first space between a preceding vehicle traveling in front of the host vehicle and a crossing position where the other vehicle will cross over the travel path, and sets a second space between the crossing position and the host vehicle; and the vehicle controller performs a control to form the first space and the second space.

2. The vehicle control device according to claim 1, wherein, in a case it is determined by the behavior determiner that the other vehicle will cross in front of the host vehicle and travel straight forward, the space setter sets the space between a preceding vehicle traveling in front of the host vehicle and a crossing position where the other vehicle will cross over the travel path.

3. The vehicle control device according to claim 1, wherein the space setter makes the second space larger as the first space becomes smaller.

4. The vehicle control device according to claim 1, wherein the space setter is configured to set the space in front of the other vehicle in accordance with the behavior of the other vehicle.

* * * * *